US011335109B2

(12) United States Patent
Godefroy et al.

(10) Patent No.: US 11,335,109 B2
(45) Date of Patent: May 17, 2022

(54) COMPUTING DEVICE FOR DOCUMENT AUTHENTICATION AND A METHOD TO OPERATE THE SAME

(71) Applicant: Marlabs Innovations Private Limited, Bengaluru (IN)

(72) Inventors: Dominique Godefroy, Princeton, NJ (US); Arun Moothedath, Hillsborough, NJ (US)

(73) Assignee: MARLABS INCORPORATED

(*) Notice: Subject to any disclaimer, the term of this patent is extended or adjusted under 35 U.S.C. 154(b) by 499 days.

(21) Appl. No.: 16/553,252

(22) Filed: Aug. 28, 2019

(65) Prior Publication Data

US 2020/0074168 A1    Mar. 5, 2020

Related U.S. Application Data

(60) Provisional application No. 62/723,530, filed on Aug. 28, 2018.

(51) Int. Cl.
| | |
|---|---|
| G06V 30/40 | (2022.01) |
| G06F 16/93 | (2019.01) |
| H04L 9/08 | (2006.01) |
| G06F 16/13 | (2019.01) |
| G06V 20/80 | (2022.01) |

(52) U.S. Cl.
CPC ............ G06V 30/40 (2022.01); G06F 16/137 (2019.01); G06F 16/93 (2019.01); G06V 20/80 (2022.01); H04L 9/0866 (2013.01)

(58) Field of Classification Search
CPC ...... G06F 16/152; G06F 16/21; G06F 16/137; H04L 2209/38; H04L 9/3239; H04L 9/3247

See application file for complete search history.

(56) References Cited

U.S. PATENT DOCUMENTS

| | | | |
|---|---|---|---|
| 2009/0116064 A1* | 5/2009 | Kawara | G06F 3/1254 358/1.15 |
| 2014/0310779 A1* | 10/2014 | Lof | H04L 9/088 726/4 |
| 2018/0121923 A1 | 5/2018 | Uhr et al. | |

FOREIGN PATENT DOCUMENTS

| | | | |
|---|---|---|---|
| DE | 102017204536 B3 | 3/2017 | |
| EP | 3319006 A1 | 11/2016 | |

(Continued)

*Primary Examiner* — King Y Poon
*Assistant Examiner* — Michael Burleson
(74) *Attorney, Agent, or Firm* — Jason C. Cameron

(57) ABSTRACT

A computing device for document authentication and a method to operate the same are provided. The computing device includes one or more processors, a securing subsystem configured to generate at least one unique identification to one or more users, a registration subsystem configured to enable the one or more users to register the one or more documents upon using the at least one unique identification, an encryption subsystem configured to encrypt the one or more documents, a hash subsystem configured to hash each of the one or more documents, a digital signature subsystem configured to generate a unique digital signature associated with each of one or more hashed documents, a private network subsystem configured to upload the one or more hashed documents into a Hyperledger of a blockchain platform, a validation subsystem configured to validate the one or more documents and to provide services associated with validated documents.

8 Claims, 3 Drawing Sheets

(56) References Cited

FOREIGN PATENT DOCUMENTS

| KR | 101637868 B1 | 2/2016 |
|---|---|---|
| WO | 2017195164 A1 | 5/2016 |

* cited by examiner ental patent
COMPUTING DEVICE FOR DOCUMENT AUTHENTICATION AND A METHOD TO OPERATE THE SAME

CROSS-REFERENCE TO RELATED APPLICATION

This application claims the benefit of provisional patent application having Patent Application No. 62/723,530 filed on Aug. 28, 2018 in the United States of America.

FIELD OF INVENTION

Embodiments of the present disclosure relates to document authentication, and more particularly to a computing device for document authentication and a method to operate the same.

BACKGROUND

Document authentication is a process of verifying a genuineness of a document or a signature in order to make the document effective and valid. One such conventional method of authenticating the document is through a physical verification method. In such method, a verifying authority physically compares the document with a pre-stored record or a pre-stored document and authenticates if the document is valid or not. However, such a method is time consuming as the verification of the documents is done manually, hence efficiency of such method is reduced and is also not scalable.

In comparison with the conventional method of authenticating the document, a newer method authenticates the documents on a digital platform of a centralised system. The document to be secured is encrypted using an encryption technique and is further stored on the digital platform. Further, the document is retrieved from the digital platform during validation or authentication of the document and is decrypted to confirm the authenticity of the document. If the decrypted document matches with an original document, the authenticity of the decrypted document is maintained and hence the decrypted document is authentic. Moreover, if the decrypted document does not match the original document, the authenticity of the stored document is tampered and hence is not authentic. In such a newer method, tampering the encrypted documents is easy and hence the newer method is less secure and cannot be relied on. Also, since the newer method is applied on a centralised system, a minor damage within the centralised system can lead to losing all documents.

Hence, there is a need for an improved platform for document verification and a method to operate the same to address the aforementioned issues.

BRIEF DESCRIPTION

In accordance with one embodiment of the disclosure, a computing device for document authentication is disclosed. The computing device includes one or more processors. The computing device also includes securing subsystem configured to generate at least one unique identification to one or more users based on a corresponding responsibility of each of the one or more users. The computing device also includes a registration subsystem configured to enable the one or more users to register the one or more documents upon using the at least one unique identification. The computing device also includes an encryption subsystem configured to encrypt the one or more documents through at least one encryption techniques. The computing device also includes a hash subsystem configured to hash each of the one or more documents. The computing device also includes a digital signature subsystem configured to generate a unique digital signature associated with each of one or more hashed documents to authorise the one or more documents. The computing device also includes a private network subsystem configured to upload the one or more hashed documents into a Hyperledger of a blockchain platform. The computing device also includes a validation subsystem configured to validate the one or more documents on the Hyperledger. The validation subsystem is also configured to provide one or more services associated with one or more validated documents for authentication of the one or more documents.

In accordance with another embodiment of the invention, a method for authenticating one or more documents is provided. The method includes generating at least one unique identification to one or more users based on a corresponding responsibility of each of the one or more users. The method also includes enabling the one or more users to register the one or more documents upon using the at least one unique identification. The method also includes encrypting the one or more documents through at least one encryption techniques. The method also includes hashing each of the one or more documents. The method also includes generating a unique digital signature associated with each of one or more hashed documents to authorise the one or more documents. The method also includes uploading the one or more hashed documents into a Hyperledger of a blockchain platform. The method also includes validating the one or more documents on the Hyperledger. The method also includes providing one or more services associated with one or more validated documents for authentication of the one or more documents.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
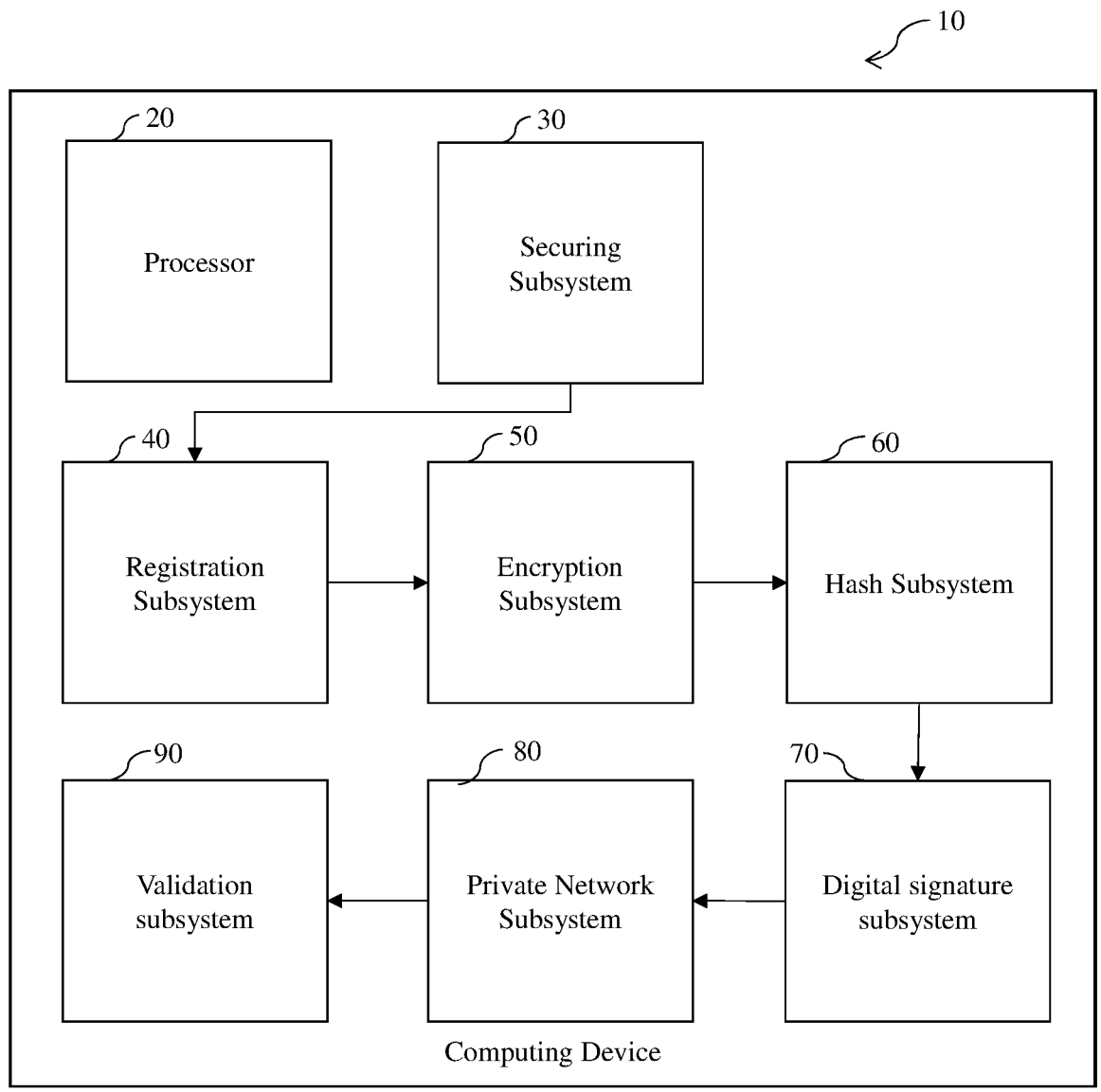
FIG. 1 is a block diagram representation of a computing device for document authentication in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a computing device for document authentication and a method to operate the same. The computing device includes one or more processors. The computing device also includes securing subsystem configured to generate at least one unique identification to one or more users based on a corresponding responsibility of each of the one or more users. The computing device also includes a registration subsystem configured to enable the one or more users to register the one or more documents upon using the at least one unique identification. The computing device also includes an encryption subsystem configured to encrypt the one or more documents through at least one encryption techniques. The computing device also includes a hash subsystem configured to hash each of the one or more documents. The computing device also includes a digital signature subsystem configured to generate a unique digital signature associated with each of one or more hashed documents to authorise the one or more documents. The computing device also includes a private network subsystem configured to upload the one or more hashed documents into a Hyperledger of a blockchain platform. The computing device also includes a validation subsystem configured to validate the one or more documents on the Hyperledger. The validation subsystem is also configured to provide one or more services associated with one or more validated documents for authentication of the one or more documents.

FIG. 1 is a block diagram representation of a computing device 10 for document authentication in accordance with an embodiment of the present disclosure. The computing device 10 includes one or more processors 20. The computing device 10 also includes a securing subsystem 30. The securing subsystem 30 is configured to generate at least one unique identification to one or more users based on a corresponding responsibility of each of the one or more users. In one embodiment, the unique identification of the one or more user may correspond to a token generated by the securing subsystem to enable the one or more user to operate the one or more documents. In one exemplary embodiment, the one or more users may correspond to a person who may be in charge to initiate an authentication of one or more documents. In another embodiment, the one or more users may correspond to an authenticating authority of the one or more documents. In yet another embodiment, the one or more users may correspond to a verifying authority. In one exemplary embodiment, the one or more documents may be associated with at least one of an educational institute, a legal team, an investigating team, a financial institution, a manufacturing unit, government authorities and general public.

The computing device 10 also includes a registration subsystem 40. The registration subsystem 40 is configured to enable the one or more users to register the one or more documents with upon using the at least one unique identification. More specifically, the one or more users uploads the one or more documents to the computing device 10 using the at least one unique identification. In one embodiment, the registration subsystem 40 may be configured to validate a know your customer (KYC) procedure for the one or more registered users. In such embodiment, the KYC procedure may be associated with validating a digital identity of the corresponding one or more users. In one exemplary embodiment, the one or more users may store, transfer, certify or review the one or more documents.

In one specific embodiment, the registration subsystem 40 may be configured to enable the one or more users to register the one or more documents which may be associated with at least one of an insurance, an event, a settlement, a redemption and a report. In such embodiment, the registration subsystem may further be configured to enable a lifecycle workflow.

The computing device 10 also includes an encryption subsystem 50. The encryption subsystem 50 is configured to encrypt the one or more documents through at least one encryption techniques. In one embodiment, the one or more documents may be encrypted using at least one of a private key of one or more asymmetric keys. As used herein, the term 'encryption' is defined as a process of converting information or data into a code to avert an unauthorised access from a third party. Also, the term 'asymmetric keys' is defined as a pair of keys generated for encryption and decryption of data in a cryptographic decentralised platform. Further, the pair of asymmetric keys includes a private key and a public key.

Furthermore, the computing device 10 also includes a hash subsystem 60. The hash subsystem 60 is configured to hash each of the one or more documents. As used herein, the term 'hashing' is defined as a technique of producing hash values for securing data. In one embodiment, the one or more documents may be hashed to secure the same. The computing device 10 also includes a digital signature subsystem 70. The digital signature subsystem 70 is configured to generate a unique digital signature associated with each of one or more hashed documents to authorise the one or more documents. As used herein, the term 'digital signature' is defined as a mathematical method of presenting an authenticity of the one or more documents. In one embodiment, the unique digital signature associated with the one or more documents may be generated based on one or more hash values of the corresponding one or more hashed documents. In one exemplary embodiment, the unique digital signature may be generated by the pair of asymmetric keys. More specifically, the unique digital signature may be generated by the public key of the pair of asymmetric keys. In one exemplary embodiment, the unique digital signature associated with the one or more hashed documents may be generated using a digital signature mechanism.

The computing device 10 also includes a private network subsystem 80. The private network subsystem 80 is configured to upload the one or more hashed documents into a Hyperledger of a blockchain platform to secure the one or more documents. As used herein, the term 'private network' is defined as a connection within a specified network, wherein certain conditions are established within the network to promote a secured environment. Also, the term 'blockchain is defined as a growing list of records known as blocks which are linked to each other using cryptographic technique. Further, the term 'Hyperledger' is defined as a closed source blockchain platform which is cannot be accessed without the private key of the pair of asymmetric keys.

The computing device 10 also includes a validation subsystem 90. The validation subsystem 90 is configured to validate the one or more documents on the Hyperledger. In one embodiment, the one or more users who may be in charge of validating the one or more documents may access the Hyperledger through the unique digital signature to verify an integrity of the one or more documents. In one exemplary embodiment, the validation subsystem 90 may be integrated with a smart contract logic.

Furthermore, the validation subsystem 90 is also configured to provide one or more services associated with one or more validated documents for authentication of the one or more documents. In one embodiment, the one or more services may include at least one of notary attestation, transfer of ownership, sharing of the one or more documents, proof of authenticity and ownership and verification of the one or more document.

In one exemplary embodiment, the computing device 10 may further include a key pair management subsystem (not shown in FIG. 1) which may be operatively coupled to the registration subsystem 40 and the validation subsystem 90. The key pair management subsystem may be configured to generate the pair of asymmetric keys which may include the private key and the public key. In such embodiment, the public key may be used by the one or more users to register the corresponding one or more documents. In such another embodiment, the private key may be used by the one or more users to retrieve the corresponding one or more authenticated documents or to retrieve the one or more validated documents.

In another exemplary embodiment, the computing device 10 may further include a tracking subsystem (not shown in FIG. 1) which may be operatively coupled to the private network subsystem 80. The tracking subsystem may be configured to track the assignment and the ownership of the one or more documents. The tracking subsystem may also be configured to track the transaction of the one or more documents which may be associated with an event of any registered authoritative copy. In another embodiment, the tracking subsystem may be configured to validate a proof of time. In such embodiment, the tracking subsystem may track at least one of a delivery tracking, a notification tracking, tracking a status of the ownership associated with the one or more users and to track the transaction event of the one or more documents.

In one specific embodiment, the validation subsystem 90 may also be configured to validate a proof of existence. In such embodiment, the one or more users may register the one or more documents which may be associated with unique item. In one embodiment, the unique item may include at least one of a contract, a digital document and a legal hold.

In another specific embodiment, the validation subsystem 90 may be configured to validate a proof of order. In such embodiment, the proof of order may correspond to order in which the one or more documents may be submitted. In yet another embodiment, the validation subsystem may further be configured to validate a proof of identity. In such embodiment, the proof of identity may be associated with the one or more users.

In yet another specific embodiment, the validation subsystem 90 may be configured to validate a proof of authorship. In such embodiment, the proof of authorship may include at least one of electronic publishing, tracking of content changes within the one or more documents, content delivery, collaborative editing and protecting the context of the one or more documents. In yet another embodiment, the validation subsystem 90 may be further configured to validate a proof of ownership. In such embodiment, the proof of ownership may correspond to managing and validating ownership of the one or more documents.

Moreover, the computing device 10 along with the one or more processors 20 may be stored on a distributed platform such as the blockchain platform.

Furthermore, in one exemplary embodiment, the computing device 10 may include a memory (not shown in FIG. 1) which may be operatively coupled to the one or more processors 20. The memory may be configured to store the one or more hashed documents within the Hyperledger of the blockchain platform. In one exemplary embodiment, the memory operatively coupled to the one or more processors may correspond to a remote storage. In such embodiment, the remote storage may be a cloud storage.

Figure 2:
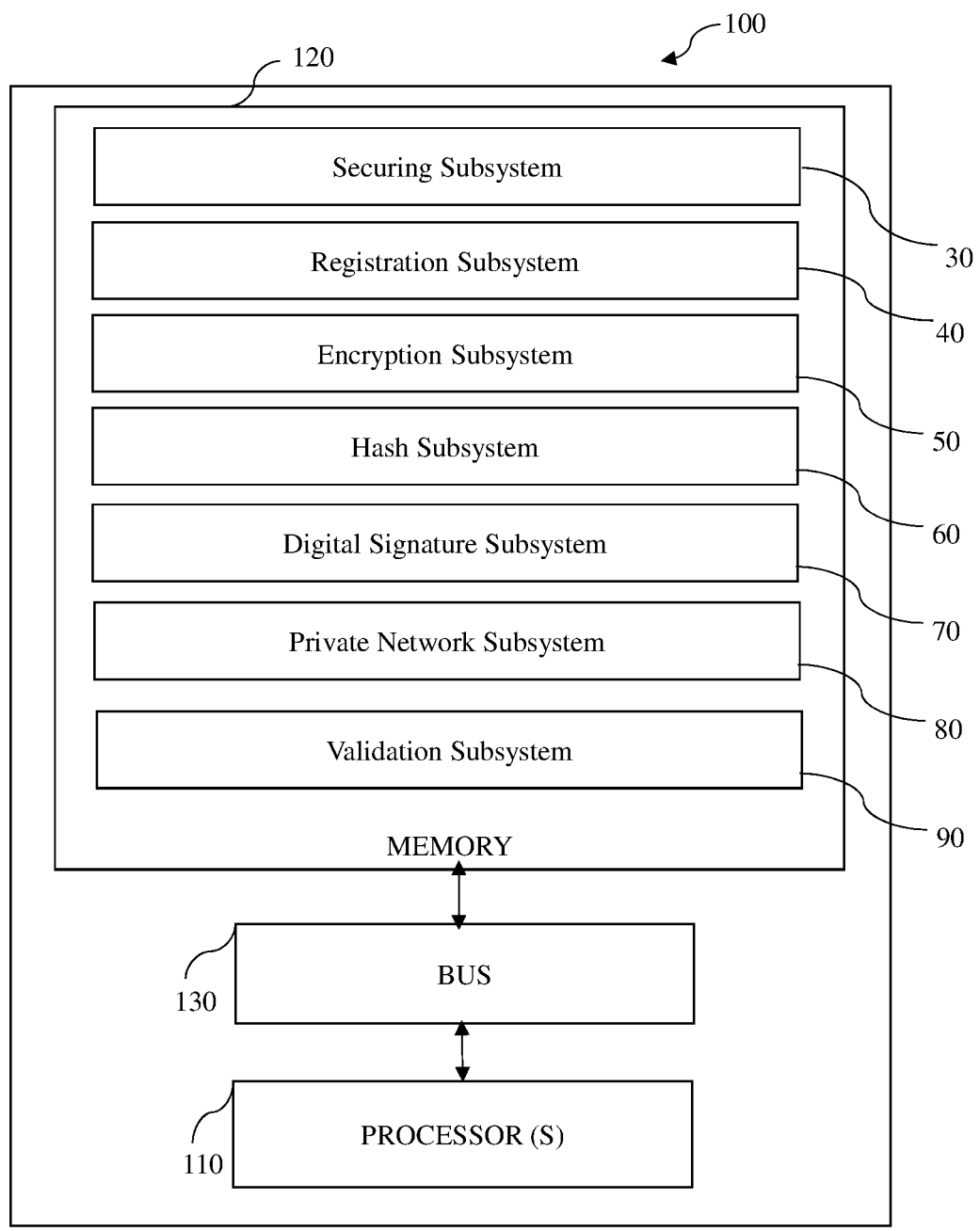
FIG. 2 is a block diagram of a computer or a server in accordance with an embodiment of the present disclosure.

FIG. 2 is a block diagram of a computer or a server in accordance with an embodiment of the present disclosure. The server 100 includes processors 110, and memory 120 coupled to the processors 110 via a bus 130.

The processor(s) 110, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 3:
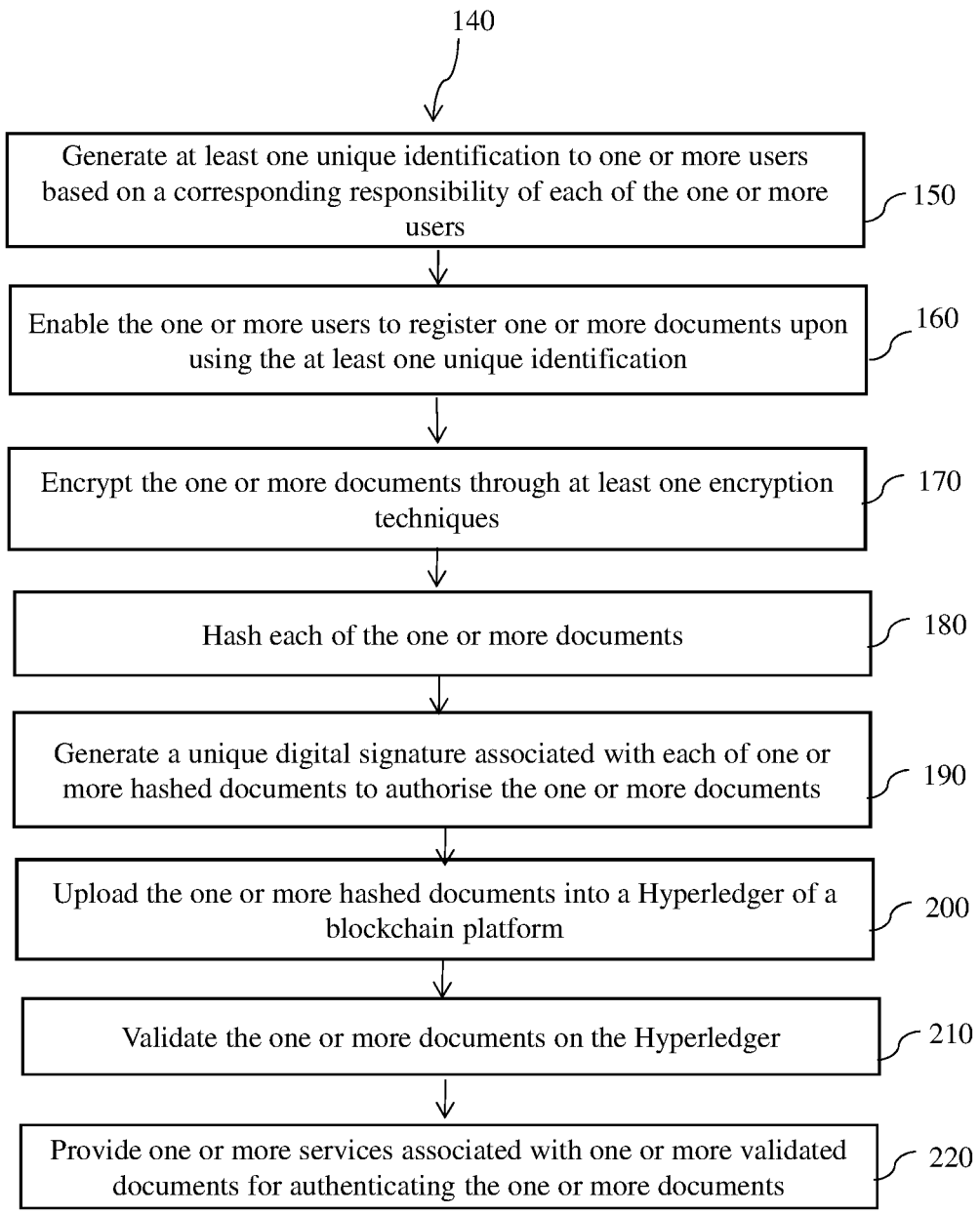
FIG. 3 is a flow chart representing steps involved in a method for authenticating one or more documents in accordance with an embodiment of the present disclosure.

The memory 120 includes a plurality of subsystems stored in the form of executable program which instructs the processor 110 to perform the method steps illustrated in FIG. 3. The memory 120 has following subsystems: securing subsystem configured to generate at least one unique identification to one or more users based on a corresponding responsibility of each of the one or more users, a registration subsystem configured to enable the one or more users to register the one or more documents upon using the at least one unique identification, an encryption subsystem configured to encrypt the one or more documents through at least one encryption techniques, a hash subsystem configured to hash each of the one or more documents, a digital signature subsystem configured to generate a unique digital signature associated with each of one or more hashed documents to authorise the one or more documents, a private network subsystem configured to upload the one or more hashed documents into a Hyperledger of a blockchain platform and; a validation subsystem configured to validate the one or more documents on the Hyperledger and to provide one or more services associated with one or more validated documents for authentication of the one or more documents.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 110.

FIG. 3 is a flow chart representing steps involved in a method 140 for authenticating one or more documents in accordance with an embodiment of the present disclosure. The method 140 includes generating at least one unique identification to one or more users based on a corresponding responsibility of each of the one or more users in step 150. In one embodiment, generating the at least one unique identification to one or more users may include generating at least one token to the one or more users. In one specific embodiment, generating the at least one unique identification may include generating the at least one unique identification by a securing subsystem.

The method 140 also includes enabling the one or more users to register the one or more documents upon using the at least one unique identification in step 160. In one exemplary embodiment, enabling the one or more users may include enabling the one or more users by a registration subsystem. In one exemplary embodiment, the method 140 may include validating a know your customer (KYC) procedure for the one or more registered users. In one specific embodiment, the method 140 may include enabling the one or more users for storing, transferring, certifying or reviewing the one or more documents. In such embodiment, enabling the one or more users to register the one or more documents may include enabling the one or more users to register the one or more documents.

Furthermore, the method 140 includes encrypting the one or more documents through at least one encryption techniques in step 170. In one embodiment, encrypting the one or more documents may include encrypting the one or more documents may be encrypted through at least one of a pair of asymmetric keys. More specifically, encrypting the one or more documents may be encrypted through a private key of the pair of the asymmetric keys. In one exemplary embodiment, encrypting the one or more documents may include encrypting the one or more documents by an encryption subsystem which may be operatively coupled to the registration subsystem.

The method 140 also includes hashing each of the one or more documents in step 180. In one embodiment, hashing each of the one or more documents may include hashing each of the one or more documents by a hash subsystem which may be operatively coupled the encryption subsystem. In one embodiment, hashing each of the one or more documents may include hashing each of the one or more documents by the private key of the pair of the asymmetric keys.

The method 140 also includes generating a unique digital signature associated with each of one or more hashed documents to authorise the one or more documents in step 190. In one embodiment, generating the unique digital signature may include generating the unique digital signature by a digital signature mechanism. In one exemplary embodiment, generating the unique digital signature may include generating the unique signature by a digital signature subsystem which may be operatively coupled to the hash subsystem.

Furthermore, the method 140 includes uploading the one or more hashed documents into a Hyperledger of a blockchain platform for securing the one or more documents in step 200. In one embodiment, uploading the one or more hashed documents may include uploading the one or more hashed documents by a private network subsystem. The method 140 also includes validating the one or more documents on the Hyperledger in step 210. In one exemplary embodiment, validating the one or more documents may include validating the one or more documents by a validation subsystem.

The method 140 also includes providing one or more services associated with one or more validated documents for authentication of the one or more documents in step 220. In one embodiment, providing the one or more services may include providing the at least one of notary attestation, transfer of ownership, sharing of the one or more documents, proof of authenticity and ownership and verification of the one or more document. In one embodiment, providing the one or more services associated with the one or more validated documents may include providing the one or more services by the validation subsystem.

In one exemplary embodiment, the method 140 may further include tracking an assignment and an ownership of the one or more documents. The method 140 may further include tracking the transaction of the one or more documents which may be associated with an event of any registered authoritative copy. The method 140 may also include validating a proof of time. In such embodiment, validating the proof of time may include tracking a delivery, a notification, a status of the ownership associated with the one or more users and the transaction event of the one or more documents. In one exemplary embodiment, tracking the assignment and the ownership of the one or more documents by a tracking subsystem.

In another exemplary embodiment, the method 140 may further include storing the one or more hashed documents within the Hyperledger of the blockchain. In such embodiment, storing the one or more hashed documents may include storing the one or more hashed documents by a memory. In one embodiment, storing the one or more hashed documents may include storing the one or more hashed documents on a remote storage. In such embodiment, storing the one or more hashed documents on the remote storage may include storing the one or more hashed documents on a cloud platform.

Various embodiments of the computing device for document authentication enables the computing device to provide a collaborated platform for document authentication on the decentralised platform such as the blockchain platform. Also, since the platform is decentralised, the one or more documents is more secured and hence can be relied on which increases the efficiency of the authenticity of the one or more documents.

In addition, as the decentralised platform is stored in the Hyperledger of the blockchain, the privacy and also the authenticity of the one or more documents is well maintained.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A computing device for authenticating one or more documents comprising:
   one or more processors;
   a securing subsystem operable by one or more processors, and configured to generate at least one unique identification to one or more users based on a corresponding responsibility of each of the one or more users;
   a registration subsystem operable by the one or more processors, and configured to enable the one or more users to register the one or more documents upon using the at least one unique identification;
   an encryption subsystem operable by the one or more processors, and configured to encrypt the one or more documents through at least one encryption techniques;
   a hash subsystem operable by the one or more processors, and configured to hash each of the one or more documents;
   a digital signature subsystem operable by the one or more processors, and configured to generate a unique digital signature associated with each of one or more hashed documents to authorise the one or more documents;
   a private network subsystem operable by the one or more processors, and configured to upload the one or more hashed documents into a Hyperledger of a blockchain platform;
   a validation subsystem operable by the one or more processors, and configured to:
      validate the one or more documents on the Hyperledger; and
      provide one or more services associated with one or more validated documents for authentication of the one or more documents.

2. The computing device as claimed in claim 1, wherein the one or more documents comprises one of an insurance, an event, a settlement, a redemption or a report.

3. The computing device as claimed in claim 1, wherein the validation subsystem is further configured to validate one or more parameters, wherein the one or more parameters comprises at least one of a proof of existence, a proof of order, a proof of authorship, a proof of ownership, a proof of identity, a proof of time or a combination thereof.

4. The computing device as claimed in claim 1, comprising a tracking subsystem operable by the one or more processors, and configured to:
   track an assignment and an ownership of the one or more documents; and
   track a transaction of the one or more documents which may be associated with an event of any registered authoritative copy.

5. A method for authenticating one or more documents comprising:
   generating, by a securing subsystem, at least one unique identification to one or more users based on a corresponding responsibility of each of the one or more users;
   enabling, by a registration subsystem, the one or more users to register the one or more documents upon using the at least one unique identification;
   encrypting, by an encryption subsystem, the one or more documents through at least one encryption techniques;
   hashing, by a hash subsystem, each of the one or more documents;
   generating, by a digital signature subsystem, a unique digital signature associated with each of one or more hashed documents to authorise the one or more documents;
   uploading, by a private network subsystem, the one or more hashed documents into a Hyperledger of a blockchain platform;
   validating, by a validation subsystem, the one or more documents on the Hyperledger; and
   providing, by the validation subsystem, one or more services associated with one or more validated documents for authenticating the one or more documents.

6. The method as claimed in claim 5, wherein enabling the one or more users to register the one or more documents comprises enabling the one or more users to register one of an insurance, an event, a settlement, a redemption or a report.

7. The method as claimed in claim 5, comprising validating, by the validation subsystem, validate one or more parameters, wherein the one or more parameters comprises at least one of a proof of existence, a proof of order, a proof of authorship, a proof of ownership, a proof of identity, a proof of time or a combination thereof.

8. The method as claimed in claim 5, comprising:
   tracking, by a tracking subsystem, an assignment and an ownership of the one or more documents; and
   tracking, by the tracking subsystem, a transaction of the one or more documents which may be associated with an event of any registered authoritative copy.

\* \* \* \* \*